United States Patent
Kang et al.

(10) Patent No.: US 9,799,924 B2
(45) Date of Patent: Oct. 24, 2017

(54) ELECTROLYTE SOLUTION FOR SECONDARY LITHIUM BATTERY AND SECONDARY LITHIUM BATTERY USING THE SAME

(71) Applicant: Samsung Electronics Co., Ltd., Suwon-si, Gyeonggi-do (KR)

(72) Inventors: Yoonsok Kang, Seongnam-si (KR); Insun Park, Hwaseong-si (KR); Junyoung Mun, Seoul (KR); Minsik Park, Hwaseong-si (KR); Jinhwan Park, Seoul (KR); Byungjin Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 467 days.

(21) Appl. No.: 14/499,716

(22) Filed: Sep. 29, 2014

(65) Prior Publication Data
US 2015/0104716 A1  Apr. 16, 2015

(30) Foreign Application Priority Data
Oct. 10, 2013 (KR) .................. 10-2013-0120865

(51) Int. Cl.
| | |
|---|---|
| H01M 10/0567 | (2010.01) |
| H01M 4/505 | (2010.01) |
| H01M 4/525 | (2010.01) |
| H01M 4/587 | (2010.01) |
| H01M 10/0525 | (2010.01) |
| H01M 10/0568 | (2010.01) |
| H01M 10/0569 | (2010.01) |

(52) U.S. Cl.
CPC ....... *H01M 10/0567* (2013.01); *H01M 4/505* (2013.01); *H01M 4/525* (2013.01); *H01M 4/587* (2013.01); *H01M 10/0525* (2013.01); *H01M 10/0568* (2013.01); *H01M 10/0569* (2013.01); *H01M 2300/0037* (2013.01)

(58) Field of Classification Search
CPC ......... H01M 10/0567; H01M 10/0568; H01M 10/0569; H01M 10/0525; H01M 4/505; H01M 4/525; H01M 4/587; H01M 2300/0037
See application file for complete search history.

(56) References Cited

U.S. PATENT DOCUMENTS 5,686,138 A * 11/1997 Fujimoto .......... H01M 10/0569 429/231.1
5,776,627 A    7/1998 Mao et al.
6,025,096 A *  2/2000 Hope ................ H01M 10/0565 429/317
2006/0269846 A1 11/2006 Xu et al.
2010/0192770 A1  8/2010 Andarcia et al.
2013/0022815 A1  1/2013 Oki et al.

FOREIGN PATENT DOCUMENTS

| CN | 102195091 A | | 9/2011 |
|---|---|---|---|
| DE | 102012203447 | * | 9/2013 |
| JP | 10-106624 A | | 4/1998 |
| JP | 2005-225843 A | | 8/2005 |
| KR | 10-1313398 B1 | | 9/2013 |
| WO | 2006017898 A1 | | 2/2006 |

OTHER PUBLICATIONS

Nguyen et al., "Multi-functional zwitterionic compounds as additives for lithium battery electrolytes", Electrochemistry Communications, 9, 2007, pp. 109-114.
Binder et al., "Simple Chemical Transformation of Lignocellulosic Biomass into Furans and Chemicals", J. Am. Chem. Soc., 2009, 131,, pp. 1979-1985.

* cited by examiner

*Primary Examiner* — Laura Weiner
(74) *Attorney, Agent, or Firm* — Cantor Colburn LLP

(57) ABSTRACT

An electrolyte for a lithium secondary battery including a lithium salt, a non-aqueous organic solvent, and a pyrrolidine derivative represented by Formula 1,

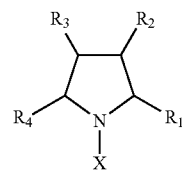

Formula 1 wherein, in Formula 1, X is hydrogen, a formyl group or a salt thereof, a carboxyl group or a salt thereof, a $C_1$-$C_{20}$ alkyl group, a $C_1$-$C_{20}$ hydroxyalkyl group, a $C_1$-$C_{20}$ aminoalkyl group, a $C_1$-$C_{20}$ thioalkyl group, or a $C_1$-$C_{20}$ cyanoalkyl group, and $R_1$ to $R_4$ are each independently hydrogen, deuterium, a halogen atom, a hydroxyl group, a thio group, a cyano group, a nitro group, an amino group, an amidino group, a hydrazine, a hydrazone, a formyl group or a salt thereof, a carboxyl group or a salt thereof, a sulfonic acid group or a salt thereof, a phosphoric acid or a salt thereof, a $C_1$-$C_{20}$ hydroxyalkyl group, a $C_2$-$C_{20}$ heteroaryl group, or a $C_6$-$C_{20}$ aryl group.

18 Claims, 5 Drawing Sheets

ELECTROLYTE SOLUTION FOR SECONDARY LITHIUM BATTERY AND SECONDARY LITHIUM BATTERY USING THE SAME

RELATED APPLICATION

This application claims priority to and the benefit of Korean Patent Application No. 10-2013-0120865, filed on Oct. 10, 2013, in the Korean Intellectual Property Office, and all the benefits accruing therefrom under 35 U.S.C. §119, the content of which is incorporated herein in its entirety by reference.

BACKGROUND

1. Field

The present disclosure relates to an electrolyte for a lithium secondary battery and lithium secondary batteries including the electrolyte, and more particularly to an electrolyte for lithium secondary batteries that may improve lifespan and high rate characteristics of batteries, and lithium secondary batteries including the electrolyte.

2. Description of the Related Art

Lithium ion batteries ("LiB") have been adopted as power sources for many mobile devices due to their high energy densities and ease of design. Recently, LiBs are being adopted as power supplies for electric vehicles and power storage and thus, the scope of research is being expanded to LiB materials that provide high energy density and long lifespan. Among the LiB materials, electrolyte additives may be used in a small amount and thus, using the electrolyte additives is a method of improving performance without substantially affecting the properties of an electrolyte.

Due to the desire for high energy density, negative electrode active materials having low potential and positive electrode active materials having high potential are used, and thus, electrolytes are exposed to environments prone to decomposition. As such, in the case of graphite negative electrodes, suitable amounts of electrolytes or additives are currently being used to form films on active materials during initial charging to prevent reduction of electrolytes.

However, as positive electrode active materials that are operated at higher voltages are used, the electrolytes are more prone to oxidation on positive electrode surfaces.

However, additives of the related art, which are for forming films on the positive electrode surfaces, are mostly over-charge protectors. In other words, when voltages increase beyond a certain voltage, thick films are formed on the positive electrode surfaces to prevent transfer of lithium ions and thus, prevent a flow of current.

Recently, research results have been reported about substantially decreasing concentrations of additives for preventing over-charging, to form thin films on the positive electrode surfaces, to thereby improve lifespan characteristics. However, because such films are non-polar, lithium ions may not easily pass through the films and thus, desired properties of LiB may be difficult to obtain. Thus the remains a need for an improved electrolyte for a lithium secondary battery.

SUMMARY

Provided is an electrolyte for a lithium secondary battery that may prevent oxidation and dissolution of electrolytes on positive electrode surfaces during high-voltage charging.

Provided is a lithium secondary battery having excellent lifespan and high rate characteristics by preventing oxidation and dissolution of the electrolyte.

Additional aspects will be set forth in part in the description which follows and, in part, will be apparent from the description.

According to an aspect, provided is an electrolyte for a lithium secondary battery, the electrolyte including: a lithium salt; a non-aqueous organic solvent; and a pyrrolidine derivative represented by Formula 1,

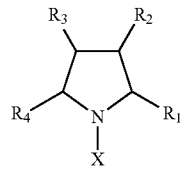

Formula 1 wherein, in Formula 1, X is hydrogen, a formyl group or a salt thereof, a carboxyl group or a salt thereof, a $C_1$-$C_{20}$ alkyl group, a $C_1$-$O_{20}$ hydroxyalkyl group, a $C_1$-$C_{20}$ aminoalkyl group, a $C_1$-$C_{20}$ thioalkyl group, or a $C_1$-$C_{20}$ cyanoalkyl group, and $R_1$ to $R_4$ are each independently hydrogen, deuterium, a halogen atom, a hydroxyl group, a thio group, a cyano group, a nitro group, an amino group, an amidino group, a hydrazine, a hydrazone, a formyl group or a salt thereof, a carboxyl group or a salt thereof, a sulfonic acid group or a salt thereof, a phosphoric acid or a salt thereof, a $C_1$-$C_{20}$ hydroxyalkyl group, a $C_2$-$C_{20}$ heteroaryl group, or a $C_6$-$C_{20}$ aryl group.

According to another aspect, provided is a lithium secondary battery including a positive electrode including a positive electrode active material capable of incorporating and deincorporating lithium; a negative electrode including a negative electrode active material capable of incorporating and deincorporating lithium; and an electrolyte disposed between the positive electrode and the negative electrode; wherein the electrolyte includes a lithium salt, a non-aqueous organic solvent, and a pyrrolidine derivative represented by Formula 1:

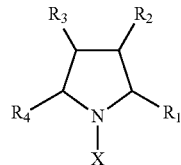

Formula 1 wherein, in Formula 1, X is hydrogen, a formyl group or a salt thereof, a carboxyl group or a salt thereof, a $C_1$-$C_{20}$ alkyl group, a $C_1$-$C_{20}$ hydroxyalkyl group, a $C_1$-$C_{20}$ aminoalkyl group, a $C_1$-$C_{20}$ thioalkyl group, or a $C_1$-$C_{20}$ cyanoalkyl group, and $R_1$ to $R_4$ are each independently hydrogen, deuterium, a halogen atom, a hydroxyl group, a thio group, a cyano group, a nitro group, an amino group, an amidino group, a hydrazine, a hydrazone, a formyl group or a salt thereof, a carboxyl group or a salt thereof, a sulfonic acid group or a salt thereof, a phosphoric acid or a salt thereof, a $C_1$-$C_{20}$ hydroxyalkyl group, a $C_2$-$C_{20}$ heteroaryl group, or a $C_6$-$C_{20}$ aryl group.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
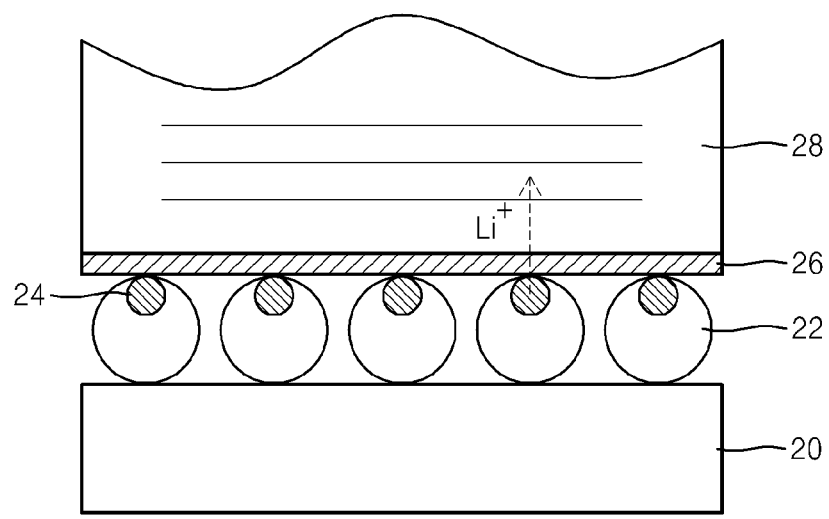
FIG. 1 is a cross-sectional view of an embodiment of a film formed on an embodiment of a surface of a positive electrode of an embodiment of a lithium secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a straight or branched chain, saturated, monovalent hydrocarbon group (e.g., methyl or hexyl).

"Aminoalkyl" means an amino substituted alkyl group.

"Amino" has the general formula —N(R)$_2$, wherein each R is independently hydrogen, a C1 to C6 alkyl, or a C6 to C12 aryl.

"Thioalkyl" means a thio (—SH) substituted alkyl group.

"Cyanoalkyl" means a cyano (—CN) substituted alkyl group.

The prefix "hetero" means that the compound or group includes at least one a heteroatom (e.g., 1, 2, or 3 heteroatom(s)), wherein the heteroatom(s) is each independently N, O, S, Si, or P.

According to an embodiment, provided is an electrolyte for a lithium secondary battery including a lithium salt, a non-aqueous organic solvent, and an additive, wherein the additive includes a pyrrolidine derivative represented by Formula 1.

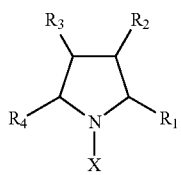

Formula 1

In Formula 1, X may be hydrogen, a formyl group or a salt thereof, a carboxyl group or a salt thereof, a $C_1$-$C_{20}$ alkyl group, a $C_1$-$C_{20}$ hydroxyalkyl group, a $C_1$-$C_{20}$ aminoalkyl group, a $C_1$-$C_{20}$ thioalkyl group, or a $C_1$-$C_{20}$ cyanoalkyl group, and $R_1$ to $R_4$ may be each independently hydrogen, deuterium, a halogen atom, a hydroxyl group, a thio group, a cyano group, a nitro group, an amino group, an amidino group, a hydrazine, a hydrazone, a formyl group or a salt thereof, a carboxyl group or a salt thereof, a sulfonic acid group or a salt thereof, a phosphoric acid or a salt thereof, a $C_{-1}$-$C_{20}$ hydroxyalkyl group, a $C_2$-$C_{20}$ heteroaryl group, or a $C_6$-$C_{20}$ aryl group.

In this regard, the $C_1$-$C_{20}$ alkyl group may be, for example, a methyl, ethyl, propyl, butyl, amyl, or hexyl group.

The $C_1$-$C_{20}$ hydroxyalkyl group may be, for example, a hydroxymethyl group, a hydroxyethyl group, a hydroxypropyl group, hydroxybutyl, hydroxyamyl, or hydroxyhexyl.

The $C_1$-$C_{20}$ aminoalkyl group may be, for example, an aminomethyl group, an aminoethyl group, an aminopropyl group, aminoisobutyl, aminobutyl, aminoamyl, or aminohexyl.

The $C_1$-$C_{20}$ thioalkyl group may be, for example, a thiomethyl group, a thioethyl group, a thiopropyl group, a thioisobutyl, thiobutyl, thioamyl, or thiohexyl.

The $C_1$-$C_{20}$ cyanoalkyl group may be, for example, a cyanomethyl group, a cyanoethyl group, a cyanopropyl group, a cyanoisobutyl group, a cyanobutyl group, a cyanoamyl group, or a cyanohexyl group.

The $C_6$-$C_{20}$ aryl group may be, for example, a phenyl group, a napthyl group, a biphenyl group, a phenalenyl group, a fluorenyl group, a phenanthrenyl group, an anthryl group, a fluoranthenyl group, or a pyrenyl group.

The $C_6$-$C_{20}$ heteroaryl group may be, for example, a pyrrolyl group, a purenyl group, a pyrrazolyl group, an imidazolyl group, a triazolyl group, a pyridyl group, a pyrimidyl group, a pyrazinyl group, a triazinyl group, a pyranyl group, a thiophenyl group, a quinolyl group, or a carbazolyl group.

When the foregoing groups are substituted, the group may be substituted with a halogen atom, a $C_1$-$C_{10}$ alkyl group substituted with a halogen atom (for example: $CCF_3$, $CHCF_2$, $CH_2F$, or $CCl_3$), a hydroxy group, a nitro group, a cyano group, an amino group, an amidino group, a hydrazine, a hydrazone, a carboxyl group or a salt thereof, a sulfonic acid group or a salt thereof, a phosphoric acid or a salt thereof, or a $C_1$-$C_{10}$ alkyl group, or a $C_2$-$C_{10}$ alkenyl group. $C_2$-$C_{10}$ alkynyl group.

In greater detail, the X may be hydrogen, a methyl group, an ethyl group, a propyl group, a hydroxyl methyl group, a hydroxy ethyl group, a hydroxy propyl group, an aminomethyl group, an aminoethyl group, an aminopropyl group, a formyl group, or a carboxyl group.

In greater detail, $R_1$ to $R_4$ may be each independently, hydrogen, deuterium, a halogen atom, a methyl group, an ethyl group, a propyl group, a hydroxy methyl group, a hydroxy ethyl group, a hydroxy propyl group, a formyl group, a carboxyl group, a phenyl group, a naphthyl group, a pyridyl group, a pyrimidyl group, or a quinolyl group.

A pyrrolidine compound represented by Formula 1 may be at least one of Compounds 1 to 6, but the pyrrolidine compound is not limited thereto.

1

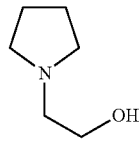

2

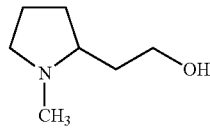

3

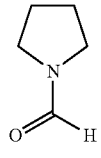

4

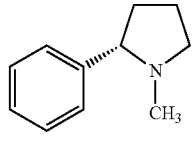

5

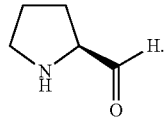

6

The pyrrolidine compound additive may be added in an amount of about 0.005 weight percent (wt %) to about 5 wt % based on a total weight of the electrolyte, for example, may be added in an amount of about 0.05 wt % or about 0.1 wt %.

When the pyrrolidine compound is added in an amount in the range above, a lithium ion conductive film, through which lithium ions may be easily conducted between the positive electrode and the electrolyte, may be formed on the positive electrode surface. The electrolyte of the lithium secondary battery is a pathway for lithium ions and thus, when the electrolyte reacts to be oxidized or reduced during a charge and discharge process, charge and discharge characteristics of the lithium secondary battery may deteriorate. The pyrrolidine compound in the electrolyte of the lithium secondary battery may be oxidized instead of the electrolyte and thus, protect the electrolyte.

In greater detail, the pyrrolidine compound in the electrolyte may be oxidized on the positive electrode surface during an initial charge and discharge process to form a film. An oxidation potential of the pyrrolidine compound is lower than an oxidation potential of the non-aqueous organic solvent included in the electrolyte. For example, the oxidation potential of the pyrrolidine compound is lower than the oxidation potential of the non-aqueous organic solvent included in the electrolyte by about 1 V to about 3 V. Accordingly, when the lithium secondary battery including the electrolyte including the pyrrolidine compound operates, the pyrrolidine compound may be oxidized and/or decomposed faster than the non-aqueous organic solvent to form a stable film on an electrode of the lithium secondary battery, for example, on the positive electrode surface. Although a mechanism for forming the positive electrode film has not been investigated, and while not wanting to be bound by theory, it seems probable that the film is formed by a ring-opening or a polymerization reaction through oxidation of the additive. The film formed on the positive electrode surface prevents direct contact between the electrolyte and the positive electrode active material to prevent oxidation of the electrolyte on the positive electrode surface and accordingly, prevents the deterioration of a charge and discharge performance of the lithium secondary battery. In this regard, the film on the positive electrode surface provides a pathway for the lithium ions to obtain a lithium secondary battery having improved lifespan and high rate characteristics. In this regard, only lithium ions may pass through the film on the positive electrode surface and electrons may not pass therethrough.

The film formed on the positive electrode surface may have a thickness of about 0.05 nm to about 100 nm, for example, about 0.1 nm to about 80 nm, or about 0.5 nm to about 50 nm. By having a thickness in the range above, the transfer of lithium ions may not be negatively affected, and oxidation of the electrolyte on the positive electrode surface may be effectively prevented.

Also, in the electrolyte of the lithium secondary battery, the pyrrolidine compound may be oxidized instead of the electrolyte by a radical material that may be easily generated during a high temperature and high voltage charge and discharge process to protect the electrolyte.

The non-aqueous organic solvent in the electrolyte for a lithium secondary battery according to an embodiment acts as a medium in which ions move that participate in an electrochemical reaction of the lithium secondary battery and the non-aqueous organic solvent may be any non-aqueous organic solvent used in the art. The non-aqueous organic solvent may be a polar aprotic solvent. For example, a carbonate-based solvent, an ester-based solvent, an ether-based solvent, a ketone-based solvent, an alcohol-based or a combination thereof may be used.

As the carbonate-based solvent, a chain carbonate compound, a cyclic carbonate compound, a fluorocarbonate compound thereof, or a combination thereof may be used.

The chain carbonate compound may be, for example, diethyl carbonate ("DEC"), dimethyl carbonate ("DMC"), dipropyl carbonate ("DPC"), methyl propyl carbonate ("MPC"), ethyl propyl carbonate ("EPC"), methyl ethyl carbonate ("MEC"), or a combination thereof, and the cyclic carbonate compound may be, for example, ethylene carbonate ("EC"), propylene carbonate ("PC"), butylene carbonate ("BC"), vinyl ethylene carbonate ("VEC"), or a combination thereof.

The fluorocarbonate compound may be, for example, fluoroethylene carbonate ("FEC"), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methyl ethylene carbonate, 4,4,5-trifluoro-5-methylethylene carbonate, trifluoromethyl ethylene carbonate, or a combination thereof.

The carbonate-based solvent may be used as a mixture of the cyclic carbonate and the chain carbonate compounds in consideration of dielectric constant, viscosity, or the like. For example, a volume ratio of the cyclic carbonate compound to the chain carbonate compound may be about 1:1 to about 1:9. The carbonate-based compound may have a fluorocarbonate compound further added to the mixture of the chain and/or cyclic carbonate compound. The fluorocarbonate compound may increase solubility of a lithium salt to increase ion conductivity and may facilitate formation of a film on the negative electrode.

According to an embodiment, the fluorocarbonate compound may be a fluoroethylene carbonate ("FEC"). The fluorocarbonate compound may be used in an amount of about 1 volume % to about 30 volume %, based on a total volume of the non-aqueous electrolyte. When the fluorocarbonate compound is used in an amount in the range above, a suitable viscosity may be maintained and desired effects may be obtained.

As the ester-based solvent, methyl acetate, ethyl acetate, n-propyl acetate, dimethyl acetate, methyl propionate, ethyl propionate, y-butyrolactone, decanolide, valerolactone, mevalonolactone, caprolactone, methyl formate, or the like may be used.

As the ether-based solvent, dibutyl ether, tetraglyme, diglyme, 1,2-dimethoxy ethane, 1,2-diethoxy ethane, ethoxy methoxy ethane, 2-methyl tetrahydrofuran, tetrahydrofuran, or the like may be used.

As the ether-based solvent, dibutyl ether, tetraglyme, diglyme, dimethoxy ethane, 2-methyl tetrahydrofuran, or tetrahydrofuran ("THF"), or the like may be used.

As the ketone-based solvent, for example, cyclohexanone or the like may be used.

As the alcohol-based solvent, ethyl alcohol, isopropyl alcohol, or the like may be used. In an embodiment, the alcohol solvent is a polar aprotic solvent, such as ethyl alcohol or isopropyl alcohol.

As the polar aprotic solvent, a nitrile such as R-CN (wherein, R is a $C_1$-$C_{20}$ hydrocarbon chain group having a chain form, branched form, or cyclic form, which may include a double bond, an aromatic ring, or an ether bond); an amide such as formamide and dimethyl formamide; a dioxolane such as 1,2-dioxolane or 1,3-dioxolane; a sulfolane such as dimethyl sulfoxide, sulfolane, or methyl sulfolane; 1,3-dimethyl-2-imidazolinone; N-methyl-2-pyrrolidinone; nitromethane; trimethyl phosphate; triethyl phosphate; trioctyl phosphate; triester phosphate; or the like may be used.

The non-aqueous organic solvent may be used alone or as a mixture of two or more thereof and when two or more thereof are used as a mixture, a mixture ratio may be suitably adjusted according to a desired battery performance and this may be easily understood by one of ordinary skill in the art.

Also, the non-aqueous organic solvent may further include an aromatic hydrocarbon-based organic solvent in addition to the carbonate-based solvent. In this regard, the carbonate-based solvent and an aromatic hydrocarbon-based organic solvent may be mixed in a volume ratio of, for example, about 1:1 to about 30:1.

As the aromatic hydrocarbon-based organic solvent, a hydrocarbon-based compound represented by the following formula may be used:

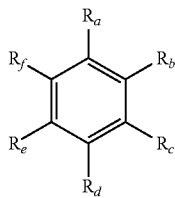

In the above formula, $R_a$ to $R_f$ may be each independently hydrogen, halogen, a $C_1$-$C_{10}$ alkyl group, a haloalkyl group, or a combination thereof.

In greater detail, the aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

Also, the lithium salt included in the electrolyte for the lithium secondary battery according to an embodiment is dissolved in an organic solvent and acts as a supply source of lithium ions in the lithium secondary battery to enable basic operation of the lithium secondary battery. The lithium salt may be any lithium salt generally used in the art. For example, the lithium salt may be $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiAlF_4$, $LiBPh_4$, $LiB_{10}Cl_{10}$, $CH_3SO_3Li$, $C_4F_3SO_3Li$, $(CF_3SO_2)_2NLi$, $LiN(C_xF_{2x+1}SO_2)(C_yF_{2y+1}SO_2)$ (wherein, x and y are natural numbers), $CF_3CO_2Li$, LiCl, LiI, lithium bis(oxalate) borate (LIBOB), a C1 to C6 aliphatic lithium carbonate, phenyl lithium borate, lithium imide, or a combination thereof. The lithium salt may be used as a supporting electrolyte salt.

A concentration of the lithium salt may be in a range of concentrations used in the art, but in greater detail, the lithium salt may be used at a concentration of about 0.1 molar (M) to about 2.0 M, but the concentration is not limited thereto. By using the lithium salt at a concentration in the range described above, the concentration of the electrolyte may be maintained at a suitable level to improve the performance of the electrolyte, and a viscosity of the electrolyte may be maintained at a suitable level to improve the mobility of lithium ions.

The electrolyte for the lithium secondary battery includes other additives to facilitate the formation of a solid electrolyte interphase ("SEI") or film to further improve cycle characteristics.

The other additives may be, for example, tris(trimethylsilyl) phosphate ("TMSPa"), lithium difluoro (oxalato) borate ("LiFOB"), vinylene carbonate ("VC"), propane sultone ("PS"), succinonitrile ("SN"), $LiBF_4$, a silane compound including a functional group that may form a siloxane bond, such as acryl, amino, epoxy, methoxy, ethoxy, or vinyl, or a silazane compound such as hexamethyldisilazane. The additive may be added alone or as a mixture of two or more thereof.

The other additive may be included in an amount of about 0.01 wt % to about 10 wt %, based on a total weight of the non-aqueous organic solvent. For example, the other additive may be included in an amount of about 0.05 wt % to about 10 wt %, 0.1 wt % to about 5 wt %, or about 0.5 wt % to about 4 wt %, based on the total weight of the non-aqueous organic solvent. However, the amount of the additive is not particularly limited as long as the use of the other additive does not substantially decrease improvement effects on capacity retention rates obtained from the use of the electrolyte Hereinafter, a lithium secondary ion battery including the electrolyte according to an embodiment will be described in greater detail.

A lithium secondary battery according to an embodiment includes a positive electrode, a negative electrode, and an electrolyte for a lithium battery disposed between the positive electrode and the negative electrode. The lithium battery may be manufactured by using a manufacturing method well known in the art. The electrolyte includes a lithium salt, a non-aqueous organic solvent, and the pyrrolidine compound represented by Formula 1. In this regard, the pyrrolidine compound represented by Formula 1, the non-aqueous organic solvent, and the lithium salt are as described above.

The pyrrolidine compound represented by Formula 1 may have nitrogen electrons that include electron-donating non-covalent electron pairs or have the nitrogen electrons and polar functional groups simultaneously, such that the pyrrolidine compound may be oxidized before the electrolyte is oxidized on the positive electrode surface to form a film in a short period of time.

Accordingly, the pyrrolidine compound in the electrolyte of the lithium secondary battery is used for the formation of the film on the positive electrode surface and thus, an amount of the pyrrolidine compound in the electrolyte may decrease after driving the lithium secondary battery. For example, the amount of the pyrrolidine compound in the electrolyte after driving the lithium secondary battery may be smaller than an amount of a piperazine derivative in the electrolyte before driving the lithium secondary battery.

The lithium secondary battery according to an embodiment may form a film on the positive electrode surface due to oxidation (dissolution) of a part of or the entire pyrrolidine compound, which is an additive included in the electrolyte, during an initial charging of the battery. As a result, when the lithium secondary battery is driven at a voltage in a range of about 3.0 V to about 5.5 V, especially at a high voltage exceeding 4.3 V, the lithium secondary battery may show excellent capacity retention characteristics as well as excellent lifespan and high rate characteristics.

By using the electrolyte including the pyrrolidine compound, a film having a thickness of about 0.05 nm to about 100 nm may be formed on the positive electrode surface of the lithium secondary battery. For example, a thickness of the film may be about 0.1 nm to about 80 nm, or about 0.5 nm to about 50 nm. The thickness of the positive electrode film may not negatively affect the transmission of lithium ions and effectively prevent oxidation of the electrolyte on the positive electrode surface.

FIG. 1 is a cross-sectional view of a film formed on a positive electrode surface of a lithium secondary battery according to an embodiment. Referring to FIG. 1, a thin film 26 is formed on a surface of a positive electrode active material 22 disposed on a positive electrode current collector 20, such that lithium ions 24 may be effectively transferred from the positive electrode to the electrolyte 28.

Figure 2:
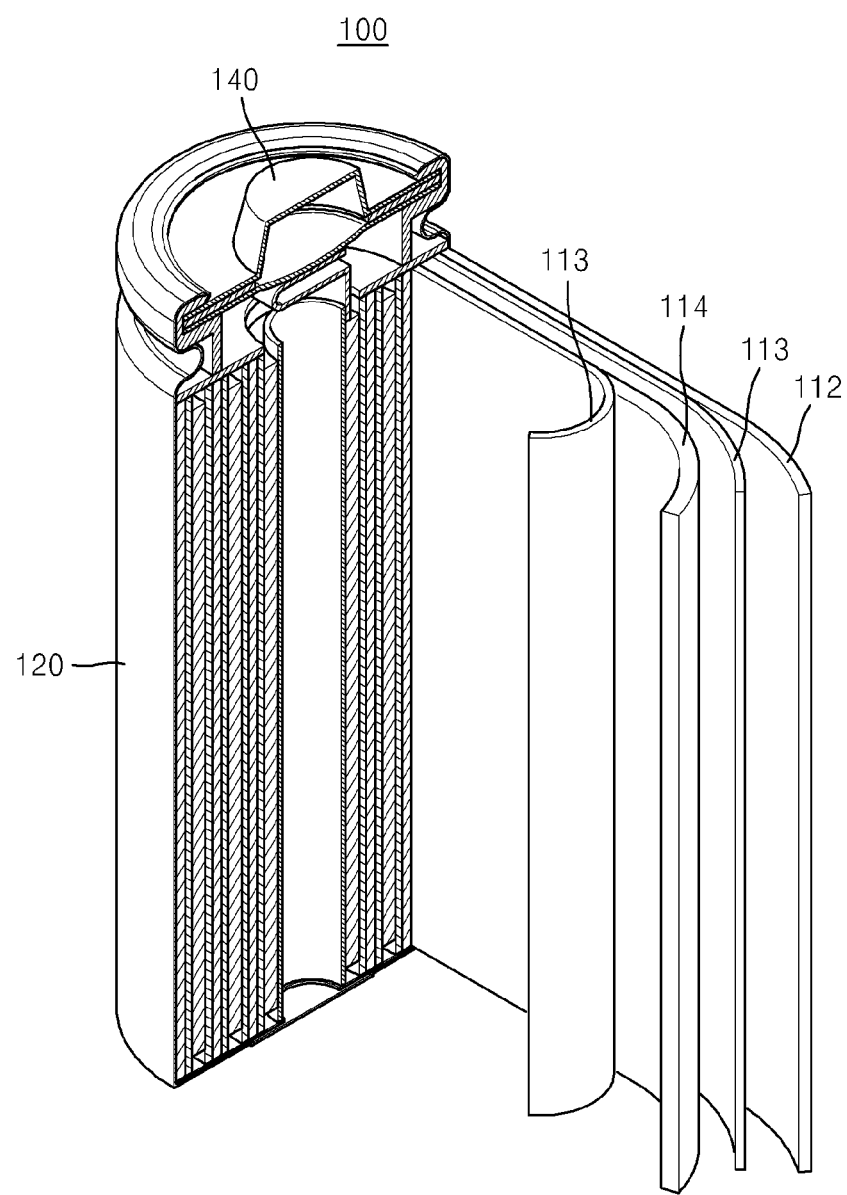
FIG. 2 is an exploded perspective view of an embodiment of a lithium secondary battery.

FIG. 2 is an exploded perspective view of a lithium secondary battery according to an embodiment. FIG. 2 is a drawing that illustrates features of a cylindrical battery, but the lithium secondary battery is not limited thereto and may be a rectangular type or a pouch type battery.

The lithium secondary batteries may be categorized as lithium ion batteries, lithium ion polymer batteries, and lithium polymer batteries, according to a type of a separator used and an electrolyte used. Lithium batteries may also be categorized as cylindrical lithium batteries, rectangular lithium batteries, coin-shaped lithium batteries, or pouch-shaped lithium batteries, according to the shape thereof. The lithium secondary batteries may also be categorized as bulk-type or thin layer-type, according to the size thereof. The shapes of the lithium secondary batteries are not particularly limited, and a structure and a manufacturing method of the lithium secondary batteries are well known in the art and thus, detailed descriptions thereof are omitted herein.

Referring to FIG. 2, in greater detail, a lithium secondary battery 100 is cylindrical and primarily includes a negative electrode 112, a positive electrode 114, a separator 113 disposed between the negative electrode 112 and the positive electrode 114, an electrolyte (not shown) impregnated in the negative electrode 112, the positive electrode 114, and the separator 113, a battery case 120, and a sealing member 140 that seals the battery case 120. The lithium secondary battery 100 is formed by sequentially laminating the negative electrode 112, the positive electrode 114, and the separator 113 and then rolling the same in a spiral form and then enclosing the same in the battery case 120.

The negative electrode 112 includes a negative electrode current collector and a negative electrode active material layer formed on the negative electrode current collector.

The negative electrode current collector may have a thickness of about 3 μm to about 500 μm and may be any of various current collectors that do not cause a chemical change in the battery and has conductivity. Examples of the negative electrode current collector are copper, stainless steel, aluminum, nickel, titanium, calcined carbon, copper and stainless steel that are surface-treated with carbon, nickel, titanium, silver, or the like, and an aluminum-cadmium alloy. The positive electrode current collector may have an uneven micro structure on its surface to enhance a binding strength with the negative electrode active material. Also, the current collector may be used in various forms including a film, a sheet, a foil, a net, a porous structure, a foam structure, or a non-woven structure.

The negative electrode active material layer includes a negative electrode active material, a binder, and optionally a conductive material.

The negative electrode active material is not particularly limited and may be any negative electrode active material generally used in the art able to incorporate and deincorporate (e.g., intercalate and deintercalate) lithium. For example, a lithium metal, a lithium metal alloy, a transition metal oxide, a material that may incorporate and deincorporate lithium, e.g., dope and undope lithium, a material that may reversibly inject and eject lithium ions, or one or more of these, may be used in combination.

The lithium metal alloy may be an alloy of lithium and sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), tin (Sn), or a combination thereof.

Non-limiting examples of the transition metal oxide include a tungsten oxide, a molybdenum oxide, a titanium oxide, a lithium titanium oxide, a vanadium oxide, and a lithium vanadium oxide.

Examples of the material that may incorporate and deincorporate lithium, e.g., intercalate and deintercalate, alloy and dealloy, or dope and undope lithium, include, for example, Si, Sn, Al, Ge, Pb, bismuth (Bi), Sb, a Si-Q alloy (wherein, Q is an alkali metal, an alkaline earth metal, a Group 11 element, a Group 12 element, a Group 13 element, a Group 14 element, a Group 15 element, a Group 16 element, a transition metal, a rare earth metal, or a combination thereof, but not Si), and a Sn-Q' alloy (wherein Q' is an alkali metal, an alkaline earth metal, a Group 11 element, a Group 12 element, a Group 13 element, a Group 14 element, a Group 15 element, a Group 16 element, a transition metal, a rare earth metal, or a combination thereof, but not Sn). The element Y may be magnesium (Mg), calcium (Ca), strontium (Sr), barium (Ba), Ra, scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), Sn, In, titanium (Ti), Ge, phosphorus (P), arsenic (As), antimony (Sb), bismuth (Bi), sulfur (S), selenium (Se), tellurium (Te), polonium (Po), or a combination thereof.

The material that may reversibly incorporate and deincorporate lithium, e.g., inject and eject lithium ions, may be a carbonaceous material and may be any carbonaceous negative electrode active material used in a lithium ion secondary battery. For example, the material may be crystalline carbon, amorphous carbon, or a mixture thereof. Non-limiting examples of the crystalline carbon include natural graphite, synthetic graphite, expandable graphite, graphene, fullerene soot, carbon nanotubes, carbon fibers, or the like. Non-limiting examples of the amorphous carbon include soft carbon (i.e. low temperature calcined carbon), hard carbon, pitch carbide, mesophase pitch carbide, and calcined coke. The carbonaceous negative electrode active material may have a spherical form, a flat form, a fiber form, a tube form, or a powder form.

The binder binds negative electrode active material particles together and binds the negative electrode active material to a current collector and representative examples of the binder include polyvinyl alcohol, carboxymethylcellulose ("CMC"), hydroxypropyl cellulose, diacetyl cellulose, polyvinyl chloride, carboxylated polyvinyl chloride, polyvinyl fluoride, a polymer including an ethylene oxide, polyvinylpyrrolidone, polyurethane, polytetrafluoroethylene, polyvinylidene fluoride, polyethylene, polypropylene, a styrene butadiene rubber, an acrylated styrene-butadiene rubber, an epoxy resin, or nylon, but the binder is not limited thereto.

The conductive material is used to provide conductivity to the electrode, and may be any electron conductive material that does not cause chemical changes to the battery and may be one of conductive materials such as a carbonaceous material such as natural graphite, synthetic graphite, carbon black, acetylene black, Ketjen black, and carbon fiber; a metal-based material such as copper, nickel, aluminum, and silver; a conductive polymer such as a polyphenylene derivative; or a mixture of two or more of these.

In this regard, amounts of the negative electrode active material, the binder, and the conductive material may be amounts generally used for a lithium battery. For example, a weight ratio of the negative electrode active material to a mixture of the conductive material and the binder may be about 98:2 to about 92:8, and a mixture ratio of the conductive material to the binder may be about 1:1.5 to about 1:3, but the ratios are not limited thereto.

The positive electrode 114 includes the positive electrode current collector and a positive electrode active material layer formed on the positive electrode current collector.

The positive electrode current collector may have a thickness of about 3 μm to about 500 μm and may be any of various current collectors that do not cause a chemical change in a battery and has conductivity. Examples of the positive electrode current collector are copper, stainless steel, aluminum, nickel, titanium, calcined carbon, copper and stainless steel that are surface-treated with carbon, nickel, titanium, silver, or the like, and an aluminum-cadmium alloy. The positive electrode current collector may have an uneven micro structure on its surface to enhance a binding strength with the positive electrode active material. Also, the current collector may be used in various forms including a film, a sheet, a foil, a net, a porous structure, a foam structure, a non-woven structure, etc.

The positive electrode active material layer includes a positive electrode active material, a binder, and optionally a conductive material.

The positive electrode active material may be a lithium-containing metal oxide, and may be any positive electrode active material generally used in the art. For example, the positive electrode active material may be a composite oxide of lithium and cobalt (Co), Mn, Ni, or a combination thereof, and in greater detail, positive electrode active material may be a compound represented by any one of following formulas: $Li_aA_{1-b}Z_bZ'_2$ (wherein, $0.90 \leq a \leq 1$, and $0 \leq b \leq 0.5$); $Li_aE_{1-b}Z_bO_{2-c}D_c$ (wherein, $0.90 \leq a \leq 1$, $0 \leq b \leq 0.5$, $0 \leq c \leq 0.05$); $LiE_{2-b}Z_bO_{4-c}D_c$ (wherein, $0 \leq b \leq 0.5$, $0 \leq c \leq 0.05$); $Li_aNi_{1-b-c}Co_bZ_cZ'_\alpha$ (wherein, $0.90 \leq a \leq 1$, $0 \leq b \leq 0.5$, $0 \leq c \leq 0.05$, $0 < \alpha \leq 2$); $Li_aNi_{1-b-c}Co_bZ_cO_{2-\alpha}Z'_\alpha$ (wherein, $0.90 \leq a \leq 1$, $0 \leq b \leq 0.5$, $0 \leq c \leq 0.05$, $0 < \alpha < 2$); $Li_aNi_{1-b-c}Co_bZ_cO_{2-\alpha}Z''_2$ (wherein, $0.90 \leq a \leq 1$, $0 \leq b \leq 0.5$, $0 \leq c \leq 0.05$, $0 < \alpha < 2$); $Li_aNi_{1-b-c}Mn_bZ_cD_\alpha$ (wherein, $0.90 \leq a \leq 1$, $0 \leq b \leq 0.5$, $0 \leq c \leq 0.05$, $0 < \alpha \leq 2$); $Li_aNi_{1-b-c}Mn_bZ_cO_{2-\alpha}F_\alpha$ (wherein, $0.90 \leq a \leq 1$, $0 \leq b \leq 0.5$, $0 \leq c \leq 0.05$, $0 < \alpha \leq 2$); $Li_aNi_{1-b-c}Mn_bZ_cO_{2-\alpha}Z''_2$ (wherein, $0.90 \leq a \leq 1$, $0 \leq b \leq 0.5$, $0 \leq c \leq 0.05$, $0 < \alpha < 2$); $Li_aNi_bE_cG_dO_2$ (wherein, $0.90 \leq a \leq 1$, $0 \leq b \leq 0.9$, $0 \leq c \leq 0.5$, $0.001 \leq d \leq 0.1$); $Li_aNi_bCo_cMn_dGeO_2$ (wherein, $0.90 \leq a \leq 1$, $0 \leq b \leq 0.9$, $0 \leq c \leq 0.5$, $0 \leq d \leq 0.5$, $0.001 \leq e \leq 0.1$); $Li_aNiG_bO_2$ (wherein, $0.90 \leq a \leq 1$, $0.001 \leq b \leq 0.1$); $Li_aCoG_bO_2$ (wherein, $0.90 \leq a \leq 1$, $0.001 \leq b \leq 0.1$); $Li_aMnG_bO_2$ (wherein, $0.90 \leq a \leq 1$, $0.001 \leq b \leq 0.1$); $Li_aMn_2G_bO_4$ (wherein, $0.90 \geq a \leq 1$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the above formulae, A is Ni, Co, Mn, or a combination thereof; Z is Al, Ni, Co, Mn, Cr, Fe, Mg, Sr, V, a rare earth metal element or a combination thereof; Z' is O, F, S, P, or a combination thereof; E is Co, Mn, or a combination thereof; Z" is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

Representative examples of the positive electrode active material include $LiMn_2O_4$, $LiNi_2O_4$, $LiCoO_2$, $LiNiO_2$, $LiMnO_2$, $Li_2MnO_3$, $LiFePO_4$, $Li_{1+x}(Ni_aCo_bMn_c)_{1-x}O_2$ wherein $0.05 \leq x \leq 0.2$, $0 < a < 1$, $0 < b < 1$, and $0 < c < 1$), and $LiNi_{0.5}Mn_{1.5}O_4$.

A compound having a coating layer on a surface thereof may be used as the positive electrode active material or a mixture of the compound and a compound having a coating layer may be used. The coating layer may include a coating element compound such as an oxide of a coating element, a hydroxide of the coating element, an oxyhydroxide of the coating element, an oxycarbonate of the coating element, or a hydroxycarbonate of the coating element. The compound forming the coating layer may be amorphous or crystalline. The coating element included in the coating layer may be Mg, Al, Co, potassium (K), sodium (Na), calcium (Ca), Si, Ti, V, tin (Sn), germanium (Ge), gallium (Ga), boron (B), arsenic (As), zirconium (Zr), or a combination thereof. A method of forming the coating layer may be any method (for example, spray coating or immersion) that does not negatively affect properties of the positive electrode active material by using the element in the compound, and the method is well known to one of ordinary skill in the art and thus, a description thereof will be omitted herein.

The binder binds positive electrode active material particles together and binds the positive electrode active material to a current collector and representative examples thereof include polyvinyl alcohol, carboxymethylcellulose (CMC), hydroxypropyl cellulose, diacetyl cellulose, polyvinyl chloride, carboxylated polyvinyl chloride, polyvinyl fluoride, a polymer including an ethylene oxide, polyvinylpyrrolidone, polyurethane, polytetrafluoroethylene, polyvinylidene fluoride, polyethylene, polypropylene, a styrene butadiene rubber, an acrylated styrene-butadiene rubber, an epoxy resin, or nylon, but the binder is not limited thereto.

The conductive material is used to provide conductivity to the electrode, and may be any electron conductive material that does not cause chemical changes to the battery and may be one of conductive materials such as a carbonaceous material such as natural graphite, synthetic graphite, carbon black, acetylene black, Ketjen black, and carbon fiber; a metal-based material such as copper, nickel, aluminum, and silver; a conductive polymer such as a polyphenylene derivative; or a mixture of two or more of these.

In this regard, amounts of the positive electrode active material, the binder, and the conductive material may be amounts generally used for a lithium battery. For example, a weight ratio of the positive electrode active material to a mixture of the conductive material and the binder may be about 98:2 to about 92:8, and a mixture ratio of the conductive material to the binder may be about 1:1.5 to about 1:3, but the ratios are not limited thereto.

The positive electrode active material may be used at a driving voltage in a range of, for example, about 3.0 V to about 5.5 V.

The positive and negative electrode active materials are each mixed with the conductive material in a solvent to prepare an active material composition, and then each composition formed therefrom is coated on a current collector to prepare a positive electrode 114 and a negative electrode 112, respectively. A manufacturing method of the electrode is well known in the art and thus, a detailed description thereof is omitted herein. The solvent may be N-methyl pyrrolidone or the like, but the solvent is not limited thereto.

A separator may be disposed between the positive electrode and the negative electrode depending on the type of the lithium secondary battery. The separator may be any separator generally used for the lithium battery. More particularly, a separator that has a low resistance to migration of ions of an electrolyte and an excellent electrolytic solution-retaining capability is suitable. For example, the separator may be glass fiber, polyester, Teflon, polyethylene, polypropylene, polyvinylidene fluoride ("PVdF"), polytetrafluoroethylene ("PTFE"), and a combination thereof, each of which may be nonwoven or woven. The separator may be single-layered or multi-layered. For example, a double-layered separator of polyethylene/polypropylene or a triple-layered separator of polyethylene/polypropylene/polyethylene or polypropylene/polyethylene/polypropylene may be used. The separator may have a pore diameter of about 0.01 μm to about 10 μm and a thickness of about 3 μm to about 100 μm.

As described above, the electrolyte includes the lithium salt, the non-aqueous organic solvent, and the pyrrolidine compound as the additive, wherein the pyrrolidine compound may be represented by Formula 1. The electrolyte is injected between the positive electrode 114 and the negative electrode 112, which are separated by a separator.

Hereinafter, detailed embodiments are described. However, the following embodiments are for illustrative purposes only and the scope is not limited thereto. Also, contents that are not described herein may easily be sufficiently technically deduced by one of ordinary skill in the art and thus, description thereof is omitted.

EXAMPLES

Preparing an Electrolyte for a Lithium Secondary Battery

Example 1

0.1 wt % of 1-(2-hydroxyethyl)pyrrolidine ("HEP") was added as an additive to an organic solvent mixture including 30 volume % of ethylene carbonate ("EC"), 40 volume % of ethylmethyl carbonate ("EMC"), and 30 volume % of dimethyl carbonate ("DMC"), and 1.3 M of $LiPF_6$ was used as a lithium salt to prepare an electrolyte for a lithium secondary battery.

Example 2

An electrolyte for a lithium secondary battery was prepared in the same manner as in Example 1, except that (−)-nicotine ("NT") was used as an additive instead of HEP.

Example 3

An electrolyte for a lithium secondary battery was prepared in the same manner as in Example 1, except that L-proline (PR) was used as an additive instead of HEP.

Example 4

An electrolyte for a lithium secondary battery was prepared in the same manner as in Example 1, except that 1-methyl-2-pyrrolidine ethanol (MPE) was used as an additive instead of HEP.

Example 5

An electrolyte for a lithium secondary battery was prepared in the same manner as in Example 1, except that 1-formyl pyrrolidine (FP) was used as an additive instead of HEP.

Example 6

An electrolyte for a lithium secondary battery was prepared in the same manner as in Example 1, except that pyrrolidine (P) was used as an additive instead of HEP.

Comparative Example 1

An electrolyte for a lithium secondary battery was prepared by adding 1.3 M $LiPF_6$ as a lithium salt to an organic solvent mixture including 30 volume % of ethylene carbonate (EC), 40 volume % of ethylmethyl carbonate (EMC), and 30 volume % dimethyl carbonate (DMC).

Preparing a Lithium Secondary Battery

Example 7

A powder of $Li_{1+x}(Ni_aCo_bMn_c)_{1-x}O_2$ (0.05≤x≤0.2), which is a positive electrode active material, a binder solution in which 5 wt % of polyvinylidene fluoride (PVdF) is dissolved in N-methyl pyrrolidone (NMP), and a conductive material (Denka black) were mixed at a weight ratio of 90:5:5 to prepare a positive electrode slurry. The positive electrode slurry was coated on an aluminum foil having a thickness of 15 μm by using a bar coating method. A product therefrom was inserted into an oven at a temperature of 90° C., dried for a first time for about 2 hours, inserted into a vacuum oven at a temperature of 120° C. to dry for a second time for about 2 hours to completely evaporate NMP, and then a product obtained therefrom was rolled and then punched to obtain a positive electrode for a coin cell having a diameter of about 1.5 cm and a thickness of about 50 μm to about 60 μm. A capacity of the positive electrode was about 2.0 mAh/cm².

The positive electrode, a graphite negative electrode (ICG1OH, a product of Mitsubishi), a polyethylene separator (Celgard 3501, a product of Celgard), and the electrolyte prepared in Example 1 were used to manufacture a battery, which is a 2032 standard coin cell.

Example 8

A lithium secondary battery was manufactured in the same manner as in Example 7, except that the electrolyte prepared in Example 2 was used as an electrolyte.

Example 9

A lithium secondary battery was manufactured in the same manner as in Example 7, except that the electrolyte prepared in Example 3 was used as an electrolyte.

Example 10

A lithium secondary battery was manufactured in the same manner as in Example 7, except that the electrolyte prepared in Example 4 was used as an electrolyte.

Example 11

A lithium secondary battery was manufactured in the same manner as in Example 7, except that the electrolyte prepared in Example 5 was used as an electrolyte.

Example 12

A lithium secondary battery was manufactured in the same manner as in Example 7, except that the electrolyte prepared in Example 6 was used as an electrolyte.

Comparative Example 2

A lithium secondary battery was manufactured in the same manner as in Example 7, except that the electrolyte prepared in Comparative Example 1 was used as an electrolyte.

Evaluation of a Redox Potential of an Additive

Redox potentials of pyrrolidine, HEP, MPE, NT, PR, and FP used as electrolyte additives in Examples 1 to 7 and Comparative Example 1 were calculated by using first principles calculation (ab-initio calculation; Gaussian 03) based on a density functional theory calculation (DFT; B3LYP/6-311+G(d,p)) and results thereof are shown in Table 1. The following redox reaction was considered during the calculation, $$M(solution) \rightarrow M^+(solution) + e^-(gas),$$

wherein, M and e respectively denote an additive molecule and an additive electron.

A polarized continuum model ("PCM") was used in consideration of an electrolyte environment surrounding the additive molecule that affects the redox voltage.

TABLE 1

| Compound | Structure 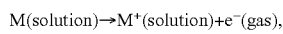 | $E_{ox}$ (V) (vs Li) |
|---|---|---|
| Pyrrolidine | | 4.00 |
| HEP | | 3.67 |
| MPE | | 3.70 |
| NT | | 3.80 |
| PR | | 4.31 |

TABLE 1-continued

| Compound | Structure | $E_{ox}$ (V) (vs Li) |
|---|---|---|
| FP | | 5.13 |
| EMC | | 6.55 |
| DEC | | 6.6 |
| EC | | 6.7 |

In Table 1, considering that a general redox potential of a carbonate-based non-aqueous organic solvent (EMC, DEC, EC) is about 6.5 V to about 6.7 V, it may be concluded that the pyrrolidine derivatives used in Examples 1 to 7 have smaller redox potentials by about 1 V to about 3 V than the redox potential of the non-aqueous organic solvent. When driving a battery including an electrolyte including the pyrrolidine derivative, the pyrrolidine derivative may dissolve before the non-aqueous organic solvent included in the electrolyte, such that a film may be effectively formed on a positive electrode surface.

Test for Charge and Discharge Characteristics of a Lithium Secondary Battery

Charging and discharging were performed to measure charge and discharge, and high temperature resistance characteristics for measuring formation charge and discharge, standard charge and discharge, and lifespan characteristics of the coin cells prepared in Examples 7 to 12 and Comparative Example 2.

Formation Charge and Discharge

The lithium secondary batteries manufactured in Examples 7 to 12 and Comparative Example 2 were subjected to two cycles of formation charge and discharge at room temperature.

During a first formation process, the coin cells were galvanostatically charged at a current of 0.1 C until a voltage of 4.65 V was reached, and then constant-voltage charged until 0.05 C was reached. Thereafter, the coin cells were galvanostatically discharged at 0.1 C until 2.5 V was reached. A second formation process was performed in the same manner as in the first formation process.

Charging at 1 C as described above refers to charging the battery such that a capacity (mAh) of the battery may be reached by charging the battery for 1 hour. Likewise, discharging at 1 C refers to discharging the battery such that a capacity (mAh) of the battery may be completely depleted by discharging the battery for 1 hour.

A Standard Charge and Discharge

After formation charge and discharge the batteries manufactured in Examples 7 to 12 and Comparative Example 2 processed through the charge at 0.5 C until 4.55 V was reached, the batteries were discharged at 0.2 C until 2.5 V was reached. The charge and discharge condition used during this process was set as the standard charge and discharge condition and the discharge capacity during this process was set as the standard capacity. The measured standard capacity was about 2.9 mAh to about 3.1 mAh.

Cycle Capacity Retention Ratio

After subjecting the lithium ion batteries manufactured in Examples 7 to 12 and Comparative Example 2 to a formation charge and discharge process, the lithium ion batteries were charged at 1C until 4.55 V was reached in an isothermal chamber at a temperature of 25° C. and then discharged at 1 C until 2.5 V was reached. A discharge capacity during this process (a discharge capacity of the first cycle) was measured. Thereafter, the same 1 C charging and 1 C discharging were repeated 300 times in a chamber at a temperature of 25° C and a discharge capacity in each cycle was measured. A cycle capacity retention ratio was calculated from the discharge capacity measured in each cycle. The capacity retention ratio in each cycle is obtained as shown in Equation 1.

cycle capacity retention ratio (%)=(discharge capacity in $n^{th}$ cycle /discharge capacity in $1^{st}$ cycle)× 100         Equation 1

Figure 3:
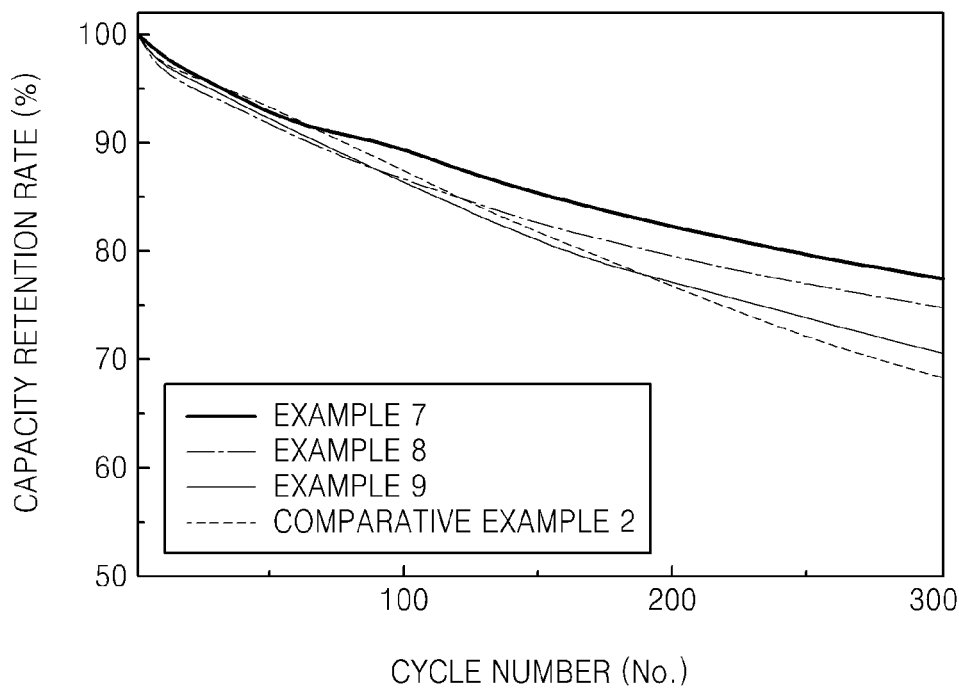
FIG. 3 is a graph of capacity retention (percent, %) versus cycle number (No.) showing discharge capacities of lithium ion batteries manufactured in Examples 7 to 9 and Comparative Example 2.

FIG. 3 is a graph showing discharge capacities of the lithium ion batteries manufactured in Examples 7 to 9 and Comparative Example 2. It may be seen from the graph in FIG. 3 that the discharge capacities are from the smallest from Example 7, Example 8, Example 9, to Comparative Example 2.

Figure 4:
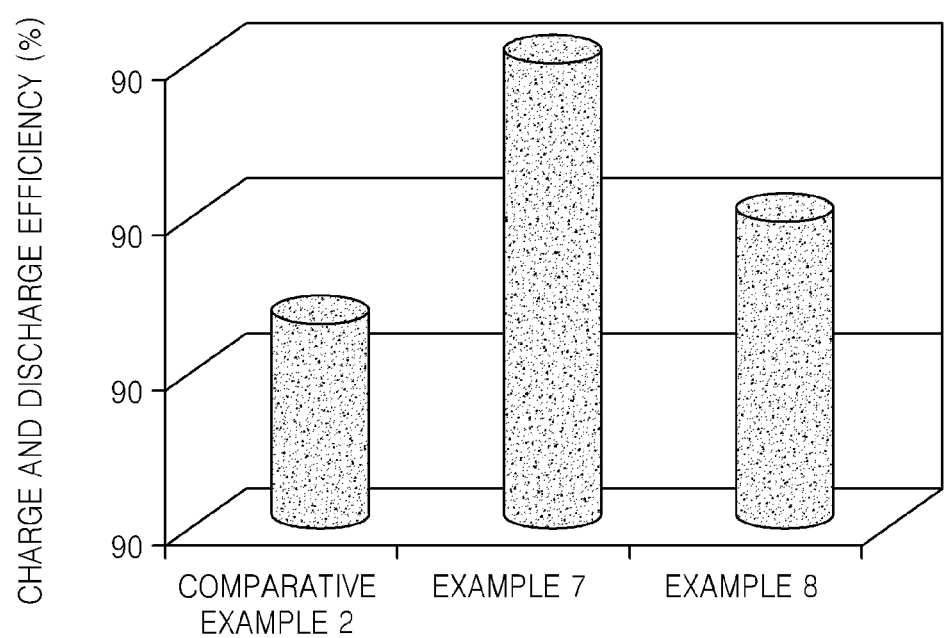
FIG. 4 is a graph of charge and discharge efficiency (percent, %) showing average charge and discharge efficiencies of the lithium secondary batteries in Examples 7 and 8, and Comparative Example 2.

FIG. 4 is a graph showing average charge and discharge efficiencies of 300 cycles of charge and discharge processes in each of Examples 7 and 8, and Comparative Example 2. The average charge and discharge efficiencies are values obtained from (an average of (discharge capacity in $n^{th}$ cycle/charge capacity in $n^{th}$ cycle)). It may be seen from the graph of FIG. 4 that average charge and discharge efficiencies are from the greatest to the smallest from Example 7, Example 8, to Comparative Example 2.

Evaluation of High Rate Characteristics

Figure 5:
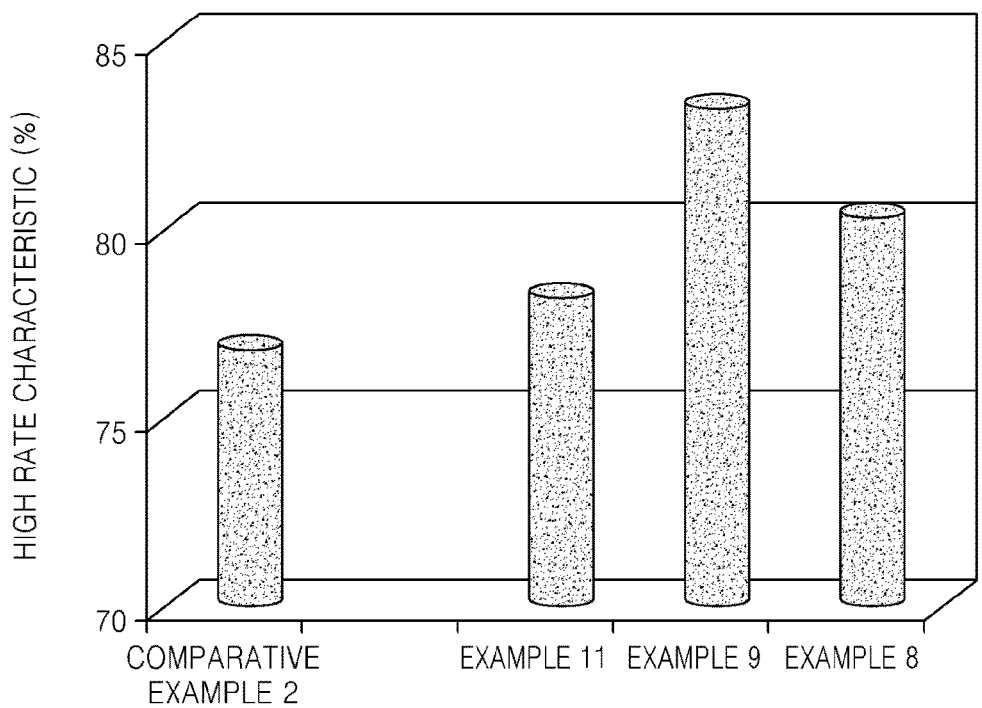
FIG. 5 is a graph of a high rate characteristic (percent, %) showing high rate characteristics of lithium secondary batteries in Examples 8, 9, and 11, and Comparative Example 2.

The batteries manufactured in Examples 8, 9, 11, and Comparative Example 2 were charged under conditions of a galvanostatic current (0.5 C) and constant-voltage (4.55 V and 0.05 C cut-off), rested for 10 minutes, discharged by changing galvanostatic conditions to 0.2 C, 0.33 C, 1 C, 2 C, and then to 5 C until 2.5 V was reached to evaluate high rate discharge characteristics (rate capability) of each battery, and results obtained therefrom are summarized in a graph in FIG. 5. The Y-axis of the graph in FIG. 5 is a percentage of 2 C discharge /discharge at 0.2 C.

It may be seen from the graph in FIG. 5 that high rate characteristics are from the greatest to the smallest from Example 9, Example 8, Example 11 to Comparative Example 2.

Differential Capacity Curve

Figure 6:
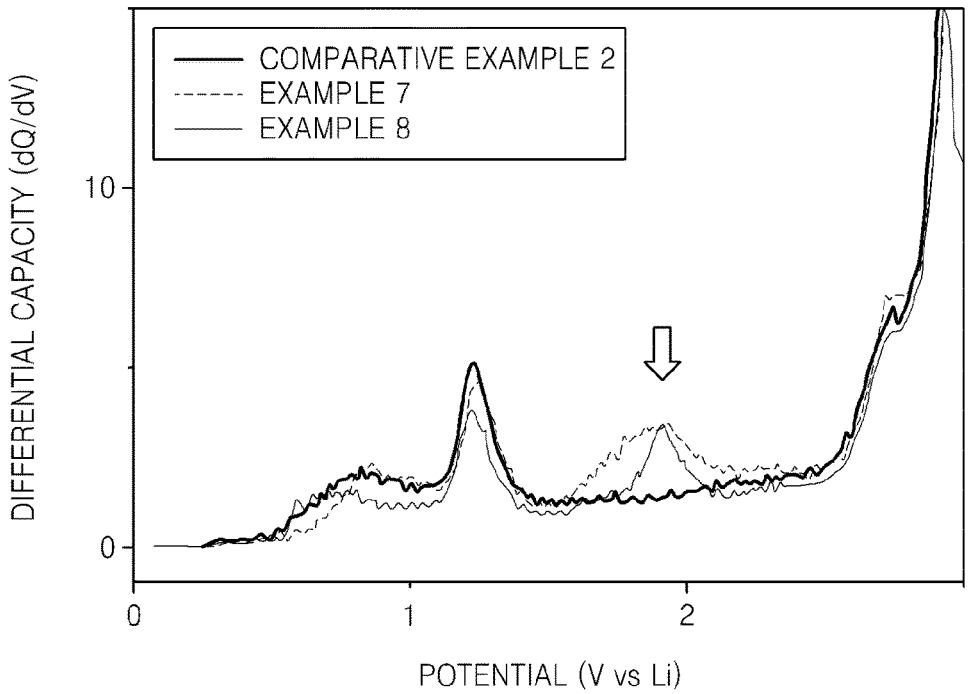
FIG. 6 is a graph of differential capacity (dQ/dV) versus potential (V vs Li) showing a differential capacity curve of the lithium secondary batteries in Example 7 and 8, and Comparative Example 2.

FIG. 6 is a differential capacity curve of the lithium secondary batteries manufactured in Example 7 and 8, and Comparative Example 2. The differential capacity curve was obtained by differentiating a graph obtained from the first charging at a speed of 0.1 C. The differential capacity curve in FIG. 6 shows peaks in the curves of Example 7 and Example 8 that are not shown in Comparative Example 2. The peaks are probably derived from the decomposition of the electrolyte additives in the lithium ion batteries manufactured in Example 7 and Example 8.

X-Ray Photoelectron Analysis

Each of the lithium ion batteries manufactured in Example 7 and Comparative Example 2 was dissolved in a glove box to recover a positive electrode, dimethyl carbonate (DMC) was used to remove electrolytes and salts smeared on the positive electrodes, and then the positive electrodes were dried. Materials on a positive electrode surface were sampled and then subjected to X-ray photoelectron spectroscopy (XPS) (Sigma Probe, a product of Thermo, UK) under vacuum conditions and results obtained therefrom are shown in FIG. 7 and Table 2.

Figure 7:
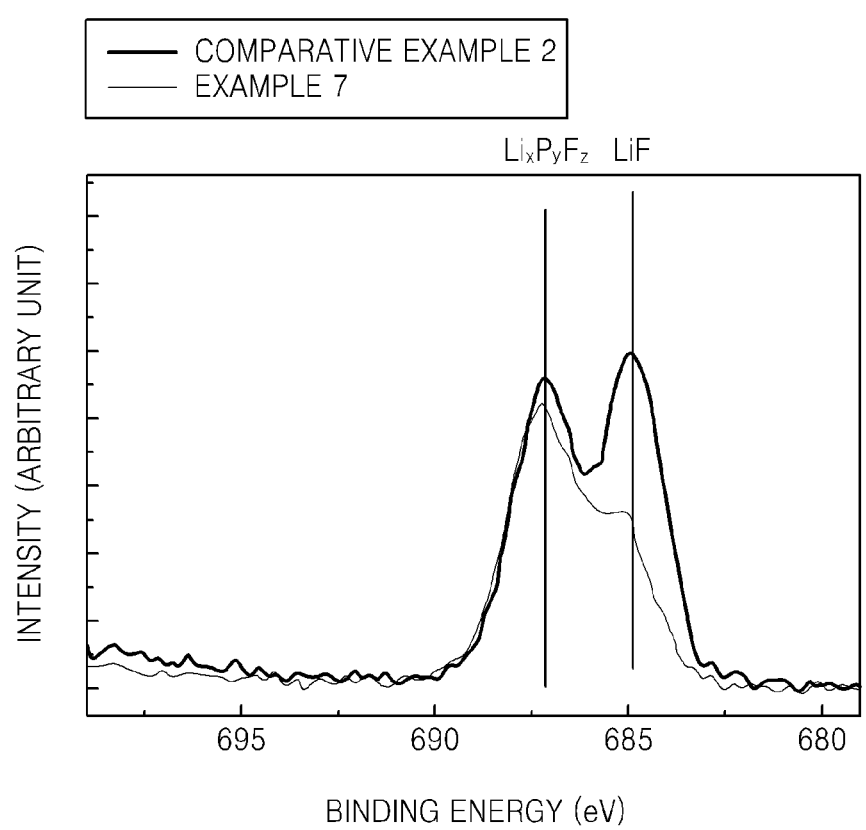
FIG. 7 is a graph of intensity (arbitrary units) versus binding energy (electron volts, eV) showing the results of X-ray photoelectron spectroscopy ("XPS") analysis including 1s peaks of fluorine (F) in the lithium secondary batteries in Example 7 and Comparative Example 2.

FIG. 7 is an XPS graph showing 1s peaks of fluorine elements (F). It may be seen from spectra of FIG. 7 that LiF peaks in Example 7 are smaller than the LiF peaks in Comparative Example 2. LiF is a representative highly resistive material for forming a film, and a large amount of LiF included in the film indicates that the film is highly resistant. Accordingly, the film obtained in Example 7 by using the HEP additive probably has low resistance and this coincides with high rate characteristics of the lithium secondary battery manufactured in Example 7. However, it may be concluded from Table 2 that the size of the peaks of lithium 1s, fluorine 1s, and phosphorus 1s of positive electrode surface materials in Example 7 are smaller than those of Comparative Example 2, but the size of the peaks of carbon 1s, nitrogen 1s, oxygen 1s, manganese 2p, and cobalt 2p in Example 7 are larger than those of Comparative Example 2. Because components of the film on the positive electrode surface are nitrogen, oxygen, and carbon, which are the elements included in the additives used, it may be concluded that the film was formed due to the decomposition of the additives.

The lithium secondary batteries according to the examples described above include films formed from the electrolytes on the positive electrode surfaces of the lithium secondary batteries during an initial charge and discharge process, which may prevent direct contact between the electrolyte and the positive electrode active material. Also, because electrons do not pass through the film, the electrolyte may be prevented from losing electrons to the positive electrode and being oxidized in a high voltage condition. Also, due to the presence of the additive, the electrolyte may be prevented from being decomposed in a high voltage environment. Accordingly, since loss of the electrolyte in high voltage conditions is prevented, capacity and efficiency of the lithium secondary battery may be maintained at a high level and thus, the lithium secondary battery may have a long lifespan.

As described above, according to the one or more of the above embodiments, a pyrrolidine compound that may form a film on a positive electrode surface of a lithium secondary battery and may be oxidized instead of an electrolyte may be included as an additive in the electrolyte to improve lifespan and high rate characteristics of the lithium secondary battery.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electrolyte for a lithium secondary battery, the electrolyte comprising:
a lithium salt;
a non-aqueous organic solvent; and
a pyrrolidine derivative represented by Formula 1,

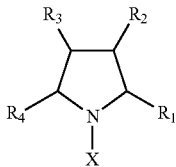

Formula 1 wherein, in Formula 1,
X is hydrogen, a formyl group or a salt thereof, a carboxyl group or a salt thereof, a $C_1$-$C_{20}$ alkyl group, a $C_1$-$C_{20}$ hydroxyalkyl group, a $C_1$-$C_{20}$ aminoalkyl group, a $C_1$-$C_{20}$ thioalkyl group, or a $C_1$-$C_{20}$ cyanoalkyl group, and
$R_1$ to $R_4$ are each independently hydrogen, deuterium, a halogen atom, a hydroxyl group, a thio group, a cyano group, a nitro group, an amino group, an amidino group, a hydrazine, a hydrazone, a formyl group or a salt thereof, a carboxyl group or a salt thereof, a sulfonic acid group or a salt thereof, a phosphoric acid or a salt thereof, a $C_1$-$C_{20}$ hydroxyalkyl group, a $C_2$-$C_{20}$ heteroaryl group, or a $C_6$-$C_{20}$ aryl group,
wherein the pyrrolidine derivative is contained in an amount of about 0.005 weight percent to about 5 weight percent, based on a total weight of the electrolyte.

2. The electrolyte of claim 1, wherein X is hydrogen, a methyl group, an ethyl group, a propyl group, a hydroxymethyl group, a hydroxyethyl group, a hydroxypropyl group, an aminomethyl group, an aminoethyl group, an aminopropyl group, a formyl group, or a carboxyl group.

3. The electrolyte of claim 1, wherein $R_1$ to $R_4$ are each independently, hydrogen, deuterium, a halogen atom, a methyl group, an ethyl group, a propyl group, a hydroxymethyl group, a hydroxyethyl group, a hydroxypropyl group, a formyl group, a carboxyl group, a phenyl group, a napthyl group, a pyridyl group, a pyrimidyl group, or a quinolyl group.

4. The electrolyte of claim 1, wherein the pyrrolidine derivative comprises at least one of Compounds 1 to 6:

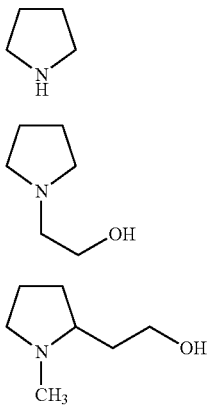

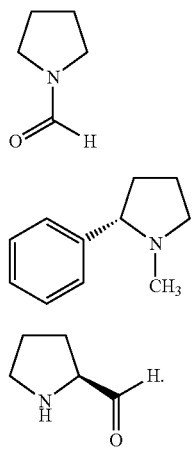

5. The electrolyte of claim 1, wherein the lithium salt comprises $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiBPh_4$, $LiN(C_xF_{2x+1}SO_2)(C_xF_{2y+1}SO_2)$ wherein x and y are natural numbers, LiCl, LiI, lithium bisoxalate borate, or a combination thereof.

6. The electrolyte of claim 1, wherein the non-aqueous organic solvent is a carbonate, an ester, an ether, a ketone, and an alcohol, or a combination thereof.

7. A lithium secondary battery comprising:
a positive electrode comprising a positive electrode active material capable of incorporating and deincorporating lithium;
a negative electrode comprising a negative electrode active material capable of incorporating and deincorporating lithium; and
an electrolyte disposed between the positive electrode and the negative electrode, wherein
the electrolyte comprises a lithium salt, a non-aqueous organic solvent, and a pyrrolidine derivative represented by Formula 1:

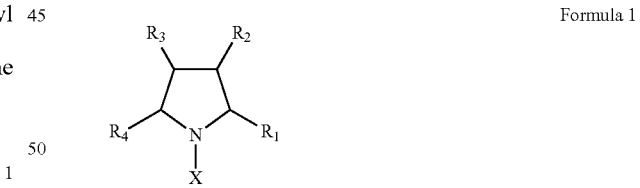

Formula 1 wherein, in Formula 1,
X is hydrogen, a formyl group or a salt thereof, a carboxyl group or a salt thereof, a $C_1$-$C_{20}$ alkyl group, a $C_1$-$C_{20}$ hydroxyalkyl group, a $C_1$-$C_{20}$ aminoalkyl group, a $C_1$-$C_{20}$ thioalkyl group, or a $C_1$-$C_{20}$ cyanoalkyl group, and
$R_1$ to $R_4$ are each independently hydrogen, deuterium, a halogen atom, a hydroxyl group, a thio group, a cyano group, a nitro group, an amino group, an amidino group, a hydrazine, a hydrazone, a formyl group or a salt thereof, a carboxyl group or a salt thereof, a sulfonic acid group or a salt thereof, a phosphoric acid or a salt thereof, a $C_1$-$C_{20}$ hydroxyalkyl group, a $C_2$-$C_{20}$ heteroaryl group, or a $C_6$-$C_{20}$ aryl group, wherein the pyrrolidine derivative is contained in an amount of about 0.005 weight percent to about 5 weight percent, based on a total weight of the electrolyte.

8. The lithium secondary battery of claim 7, wherein X is hydrogen, a methyl group, an ethyl group, a propyl group, a hydroxymethyl group, a hydroxyethyl group, a hydroxypropyl group, an aminomethyl group, an aminoethyl group, an aminopropyl group, a formyl group, or a carboxyl group.

9. The lithium secondary battery of claim 7, wherein $R_1$ to $R_4$ are each independently hydrogen, deuterium, a halogen atom, a methyl group, an ethyl group, a propyl group, a hydroxymethyl group, a hydroxyethyl group, a hydroxypropyl group, a formyl group, a carboxyl group, a phenyl group, a napthyl group, a pyridyl group, a pyrimidyl group, or a quinolyl group.

10. The lithium secondary battery of claim 7, wherein the pyrrolidine derivative comprises at least one of Compounds 1 to 6:

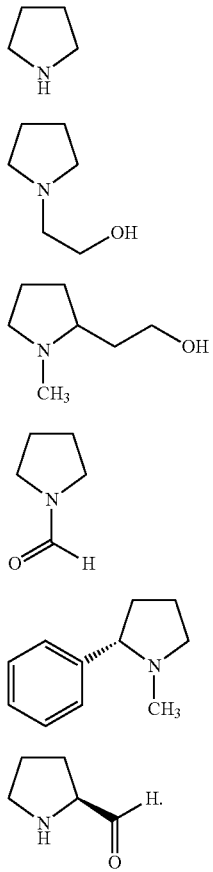

11. The lithium secondary battery of claim 7, wherein the positive electrode comprises a film formed on a surface of the positive electrode, wherein the film is derived from the pyrrolidine derivative.

12. The lithium secondary battery of claim 11, wherein the film has a thickness of about 0.05 nm to about 100 nm.

13. The lithium secondary battery of claim 7, wherein the positive electrode active material comprises $LiCoO_2$; $LiNi_{1-x}Co_xO_2$ wherein $0 \leq x < 1$; $Li_{1-x}M_xO_2$ wherein M is Mn or Fe and $0.03 \leq x < 0.1$; $Li[Ni_xCo_{1-2x}Mn_x]O_2$ wherein $0 < x < 0.5$; $Li[Ni_xMn_x]O_2$ wherein $0 < x \leq 0.5$; $Li_{1+x}(Ni_aCo_b Mn_c)_{1-y}O_z$ wherein $0 < x \leq 1$, $0 \leq y < 1$, and $2 \leq z \leq 4$ and $0 < a < 1$, $0 < b < 1$, and $0 < c < 1$, $LiM_2O_4$ wherein M is Ti, V, or Mn, $LiM_xMn_{2-x}O_4$ wherein M is a transition metal; $LiFePO_4$; $LiMPO_4$ wherein M is Mn, Co, or Ni; $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta$—$Mn_yV_2O_5$, $\delta$—$NH_4V_4O_{10}$, $Mn_{0.8}V_7O_{16}$, $LiV_3O_8$, $Cu_xV_2O_5$, $Cr_xV_6O_{13}$, $M_2(X'O_4)_3$ wherein M is a transition metal and X' is S, P, As, Mo, or W; or $Li_3M_2(PO_4)_3$ wherein M is Fe, V, or Ti.

14. The lithium secondary battery of claim 7, wherein the positive electrode active material has a voltage in a range of about 3.0 V to about 5.5 V versus lithium.

15. The lithium secondary battery of claim 14, wherein the positive electrode active material is $Li_{1-x}(Ni_aCo_bMn_c)_{1-x}O_2$ wherein $0.05 \leq x \leq 0.2$, $0 \leq a \leq 1$, $0 \leq b \leq 1$, and $0 \leq c \leq 1$, or $LiNi_{0.5}Mn_{1.5}O_4$.

16. The lithium secondary battery of claim 7, wherein the negative electrode active material comprises a vanadium oxide, a lithium vanadium oxide; Si; $SiO_x$ wherein $0 < x < 2$; a Si-Q alloy wherein Q is magnesium (Mg), calcium (Ca), strontium (Sr), barium (Ba), Ra, scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), Sn, In, titanium (Ti), Ge, phosphorus (P), arsenic (As), antimony (Sb), bismuth (Bi), sulfur (S), selenium (Se), tellurium (Te), polonium (Po) or a combination thereof; graphite; a soft carbon; a hard carbon; a mesophase pitch carbide; or calcined coke.

17. The lithium secondary battery of claim 7, wherein the lithium salt is $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiBPh_4$, $LiN(C_xF_{2x+1}SO_2)(C_yF_{2y+1}SO_2)$ wherein x and y are natural numbers, LiCl, LiI, lithium bisoxalate borate, or a combination thereof.

18. The lithium secondary battery of claim 7, further comprising a separator that electrically insulates the positive electrode and the negative electrode.

* * * * *